UNITED STATES PATENT OFFICE.

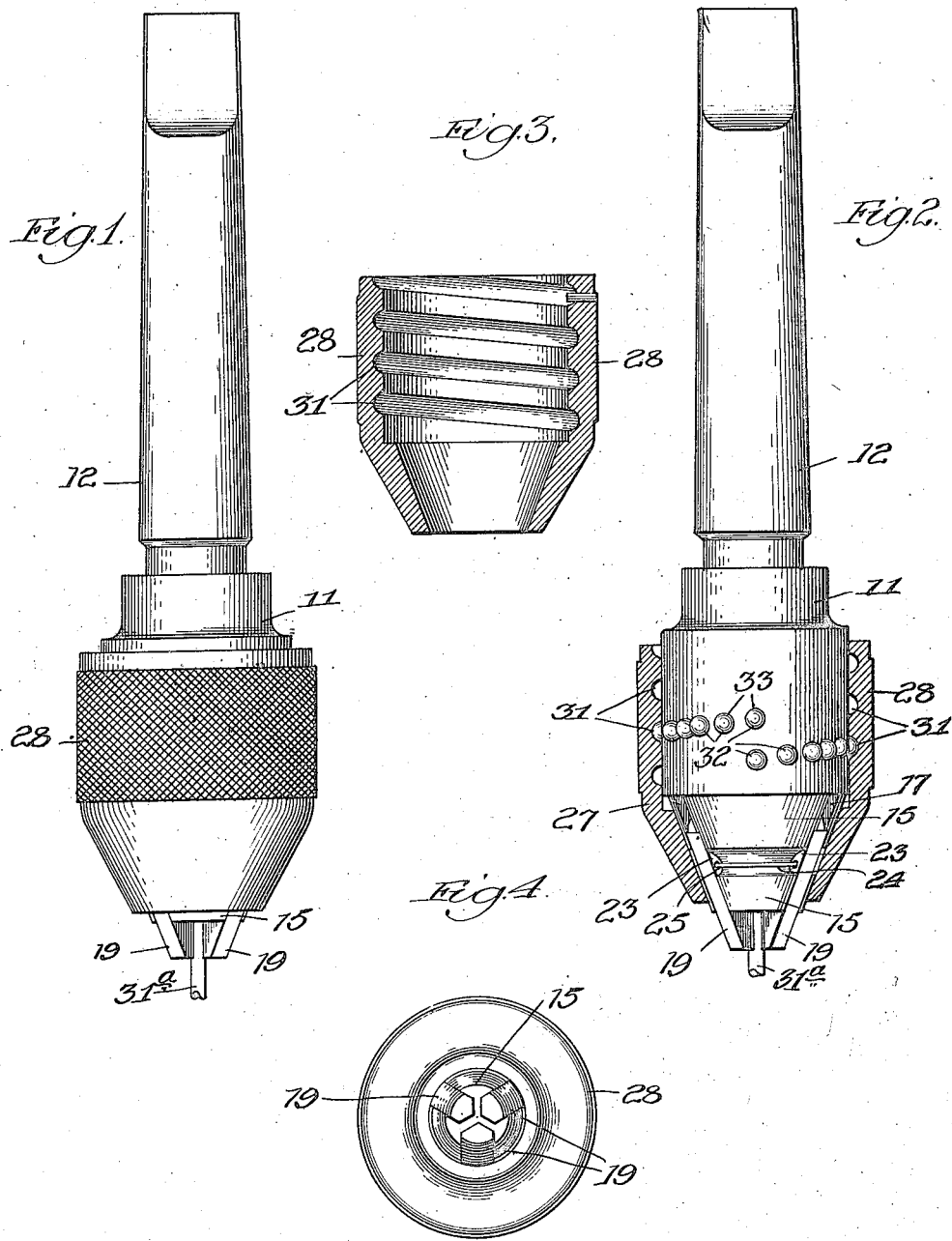

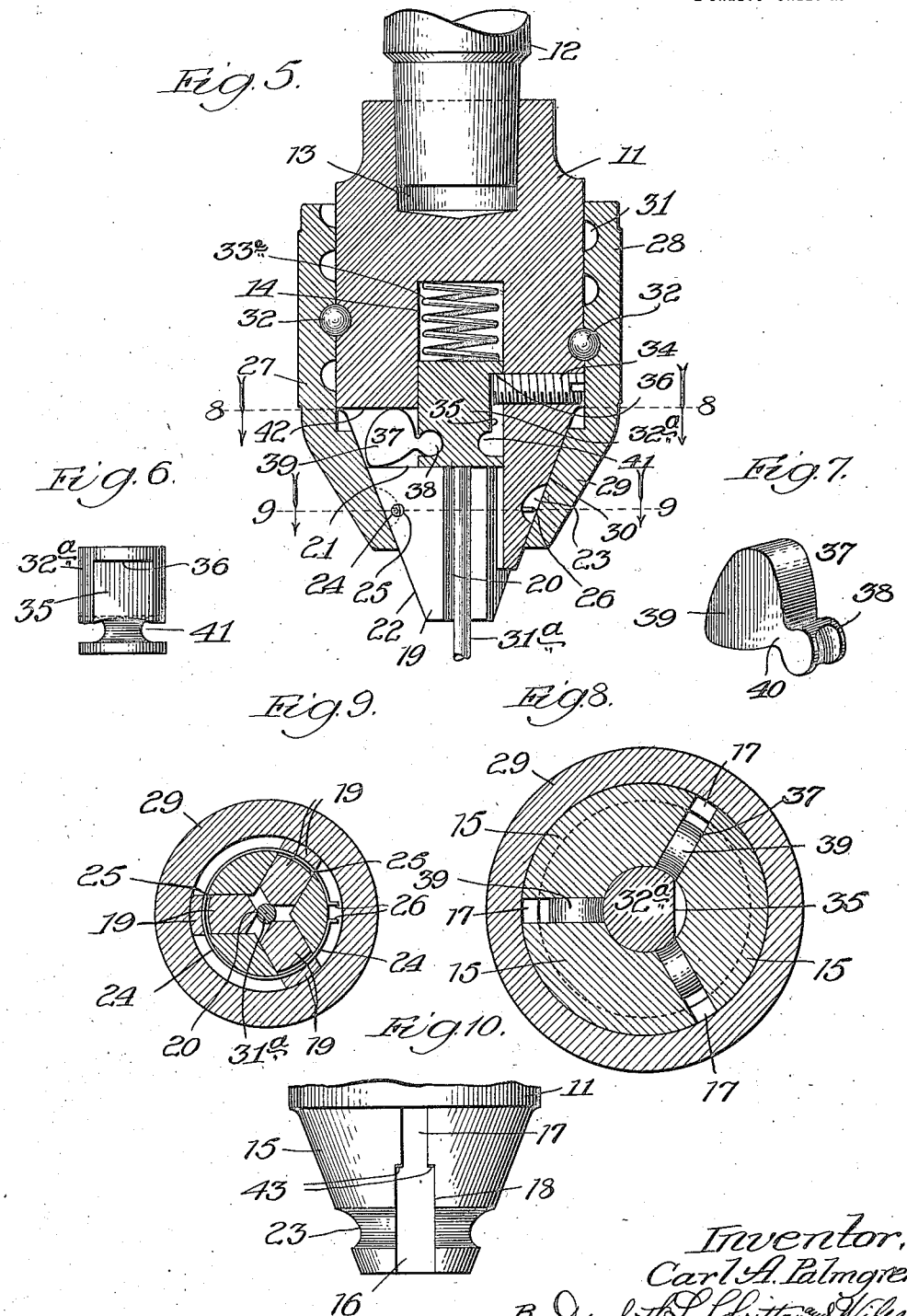

CARL A. PALMGREN, OF CHICAGO, ILLINOIS.

DRILL CHUCK.

1,425,213.

Specification of Letters Patent.

Patented Aug. 8, 1922.

Application filed August 28, 1919. Serial No. 320,501.

*To all whom it may concern:*

Be it known that I, CARL A. PALMGREN, a citizen of the United States, residing at 7362 South Shore Avenue, Chicago, in the county of Cook and State of Illinois, have invented a new and useful Improvement in Drill Chucks, of which the following is a specification.

My object, generally stated, is to provide improvements in chucks to the end that the desired rigid clamping of the drill in the chuck may be effected, the length of the chuck materially reduced over those as heretofore provided, and that the number of parts forming the chuck shall be reduced; that the adjustment of the parts of the chuck for clamping drills therein and releasing them, may be quickly effected; that the chuck shall be capable of receiving and holding drills of relatively widely varying sizes compared with the size of the chuck; and other objects as will be manifest from the following description:

Referring to the accompanying drawings, Figure 1 is a view in elevation of a chuck constructed in accordance with my invention, showing a drill, partly broken away, in position therein. Figure 2 is a similar view showing the adjustable outer sleeve, or shell, in section. Figure 3 is a sectional view of the outer sleeve of the chuck. Figure 4 is an end view of the chuck, with the tool removed. Figure 5 is an enlarged view, partly broken, in longitudinal sectional elevation, of the chuck, showing a drill secured therein. Figure 6 is a view in side elevation, and Figure 7 a perspective view, of certain details of the jaw-operating mechanism of the chuck. Figures 8 and 9 are sections taken at the lines 8—8 and 9—9, respectively, on Fig. 5 and viewed in the direction of the arrows; and Fig. 10, a broken view in elevation of the member in which the jaws of the chuck are guidingly confined.

The head of the chuck is represented at 11, this part being of circular shape in cross section and having a stem 12 preferably formed separately from the head 11, and having drive fit in a socket 13 in the upper end of the latter, this stem being adapted to be inserted into the socket usually provided in drill presses. The opposed end of the head 11 is of frusto-conical form as represented at 15, this end of the head being centrally recessed to form a socket 14 which extends inwardly beyond the base of the portion 15 of the head, the latter being slotted radially, as indicated at 16, three of these slots being provided in the particular construction illustrated and the portions of these slots adjacent the base of the portion 15 being of reduced width as represented at 17. The outer enlarged portions 18 of the slots 16 contain the drill-clamping jaws of the chuck which are provided of any desired number, three being shown in the construction illustrated, the number of slots 16 corresponding with the number of jaws. The jaws referred to and which are provided of a width slightly greater than the width of the portions 17 of the slots, and slightly narrower than the portions 18 of these slots, are represented at 19 and are preferably of the shape shown, namely of general triangular shape, the drill engaging edges 20 thereof extending parallel with each other and parallel with the median line of the chuck, the surfaces 21 at their upper edges extending preferably at right angles to the surfaces 20, and the inclined surfaces 22 being inclined relative to the median line of the chuck at the same angle as the frusto-conical surface 15. The outer end of the portion 15 of the head 11 is peripherally grooved, as indicated at 23, for receiving a spring member 24 in the form of a split ring 24 formed of spring wire which extends through openings 25 in the jaws 19 and serves, under its spring tension, to move the jaws outwardly in the guides 16 to a condition in which the chuck is expanded, the ends of the member 24 being preferably deflected outwardly as represented at 26, to prevent disengagement of the jaws therefrom when the parts of the chuck are in disassembled condition.

The head 11 is surrounded by an outer sleeve, or shell, 27 which comprises a generally cylindrical portion 28 at which it encircles the body of the head, and a frusto-conical portion 29 at which it encircles the frusto-conical portion 16 of the head, the inner surface of the part 29 being tapered to correspond with the taper of the part 15 and the edges 22 of the jaws 19, whereby upon shifting the sleeve 28 upwardly on the head 11 it will force the jaws 19 inwardly, toward each other, to grip at the edges 20, the drill inserted into the space between these jaws, as for example as shown of the drill 31ª, especially in Fig. 9. In the construction shown the relative movement of the sleeve 28 and head 11 for the purpose stated is effected by means of the provision of a spirally extending groove 31 provided about the interior of the shell 28 and a series of balls 32 located in a series of semi-circular recesses 33 arranged spirally about the periphery of the head 11 to correspond with the pitch of the thread formed by the groove 31, these balls extending into this groove and in effect forming a thread which presents the minimum friction between it and the walls of the groove 31, in the rotation of the shell 28 about the head 11. It will be understood that by this arrangement the threaded connection between the head and the shell may be of relatively wide pitch, and thus by a single rotation of the sleeve 28 the latter may be given relatively great movement lengthwise of the head 11 and relative to the latter, thereby permitting the operator to quickly clamp drills of widely varying sizes, in the chuck and quickly disengage them from the latter.

Cooperating with the means just described for drawing the jaws 19 together and for clamping a drill in place in the chuck, are means which operate automatically, in case the drill, in the drilling operation, slips in the chuck and thus exerts an upward thrust, to cause the grip of the jaw on the drill to be automatically augmented for clamping the drill sufficiently tight in the chuck to prevent slippage, a description of these means, in accordance with the preferred, illustrated, embodiment of my invention being as follows:—

Reciprocably confined in the recess 14 is a plunger $32^a$ normally outwardly spring-pressed by a coiled spring $33^a$ confined between the plunger $32^a$ and the inner end of the socket 14, this plunger being held in the socket by means of a screw 34 screwed into the body 11 and extending at its inner end into a position in which it opposes the flat side 35 of the plunger formed by cutting away a portion of the periphery of the latter between the ends of the plunger, thereby affording a shoulder 36. Cooperating with the plunger $32^a$, is a series of rock members 37 formed with substantially circular heads 38 connected with the body portions 39 of the rock members, by necks 40, the members 37 being provided of the same number as the jaws 19 and being confined, to rock, at their heads 38 in a peripheral groove 41 in the outer end of the plunger $32^a$, the walls of the groove 41 being peripherally undercut as represented, in order that the members 37 may, when introduced into the groove 41 at the flat portion 35 of the plunger, interlock therewith against accidental separation therefrom, but maintain rocking engagement between these parts. The members 37 are located between the inner surfaces 21 of the jaws 19 and the bases 42 of the recesses 16, the members 37 by preference, being of such shape and dimensions, as shown, that in the position of the parts shown in Fig. 5, the members 37 will extend from the base of the portions 17 of the slot 16, to the widened base portions 43 of the portions 18 of these slots, the portions 21 of the jaws 19 bearing against the portions 43 of the slots 16.

In the operation of the chuck, wherein the resistance afforded by the work in which the tool 31 is operating is sufficient to hold the tool against rotating, the latter will exert an inward thrust on the plunger $32^a$ with the result of moving the latter inwardly, thereby shifting the heads 38 of the members 37 likewise inwardly with the result of causing the latter to rock on the plunger $32^a$ and thereby exert by a camming action, pressure against the inner ends of the jaws 19 in a direction to force the latter outwardly, the latter sliding against the tapered surface 30 of the sleeve 29 and thereby becoming tightly gripped to the tool 31. From the foregoing it will be understood that the chuck furnishes means operating automatically to immediately tighten the grip of the chuck on the tool to prevent the turning of the latter, in the event that the grip of the jaws on the tool is not sufficient to hold the tool against the turning of the chuck independently of the tool. It will be noted that among the many advantages afforded by a chuck constructed in accordance with my invention, is that of being able to provide the chuck as a relatively short structure, inasmuch as the length of the gripping surfaces of the jaws 19 need not be nearly so long, as in the case of a structure wherein the automatic gripping feature is lacking.

While I have illustrated and described a particular construction embodying my invention, I do not wish to be understood as intending to limit it thereto as the same may be variously modified and altered without departing from the spirit of my invention, it being my intention to claim my invention as fully and completely as the prior state of the art will permit.

I claim:

1. A chuck comprising, in combination, a body member, tool-clamping jaws thereon, an element on said body member presenting a wedge surface and operating, when shifted on said body member, to engage said jaws and shift the latter into clamping engagement with a tool inserted into the chuck, and means operated by the tool in moving inwardly into the chuck, for moving said jaws toward the outer end of the chuck and against said wedge surface for forcing the jaws inwardly to tighten the grip of the jaws on the tool.

2. A chuck comprising, in combination, a body member, tool-clamping jaws thereon, means for shifting said jaws into clamping engagement with a tool inserted into the chuck, a plunger actuated by the tool in moving inwardly in the chuck, and means actuated by said plunger for moving said jaws toward the outer end of the chuck causing the jaws to tighten their grip on the tool.

3. A chuck comprising, in combination, a body member, tool-clamping jaws thereon, an element on said body member presenting a wedge surface and operating, when shifted on said body member, to engage said jaws and shift the latter into clamping engagement with a tool inserted into the chuck, and a series of movable members disconnected from said jaws and actuated by the tool in moving inwardly and adapted, when actuated, to force said jaws into tight engagement with the tool.

4. A chuck comprising, in combination, a body member, tool-clamping jaws thereon, means for shifting said jaws into clamping engagement with a tool inserted into the chuck, a movable member adapted, when actuated, to force said jaws toward the outer end of the chuck and into tight engagement with the tool, and a second member actuated by the tool in moving inwardly and operating, when actuated, to actuate said movable member.

5. A chuck comprising, in combination, a body member, tool-clamping jaws thereon, means for shifting said jaws into clamping engagement with a tool inserted into the chuck, a plunger operated by the tool in moving inwardly in the chuck, and means operated by said plunger in its inward movement for forcing said jaws toward the outer end of the chuck into clamping engagement with the tool.

6. A chuck comprising, in combination, a body member, tool-clamping jaws thereon, means for shifting said jaws into clamping engagement with a tool inserted into the chuck, a plunger operated by the tool in moving inwardly in the chuck, a spring tending to force said plunger toward said jaws, and means operated by said plunger for forcing said jaws toward the outer end of said chuck and into clamping engagement with the tool.

7. A chuck comprising, in combination, a body member, tool-clamping jaws thereon, means for shifting said jaws into clamping engagement with a tool inserted into the chuck, a plunger operated by the tool in moving inwardly in the chuck, and members having pivotal connection with said plunger and operating, when said plunger is actuated, to force said jaws toward the outer end of said chuck into clamping engagement with the tool.

8. A chuck comprising, in combination, a body member having an open end containing radially-disposed slots, jaws in said slots, a shell on said body member presenting an internal wedge-surface adapted to engage said jaws and force them toward the center of the chuck when said shell is moved along said body member, a plunger in said body member adapted to be forced inwardly by inward movement of the tool in the chuck, and a series of rock-members interposed between the inner ends of said jaws and portions of said body-member and engaging said plunger and operating when said plunger is moved inwardly by the tool to force said jaws in an outward direction against the wedge surface of said shell.

9. A chuck comprising, in combination, a body member, tool-clamping jaws thereon, a movable element on said body member presenting a wedge surface and operating, when shifted on said body member, to engage said jaws and shift the latter into clamping engagement with a tool inserted into the chuck, a plunger actuated by the tool in moving inwardly in the chuck, and means actuated by said plunger for moving said jaws toward the outer end of the chuck and against said wedge surface for causing the jaws to tighten their grip on the tool.

10. A chuck comprising, in combination, a body member, tool-clamping jaws thereon, a movable element on said body member presenting a wedge surface and operating, when shifted on said body member, to engage said jaws and shift the latter into clamping engagement with a tool inserted into the chuck, a plunger actuated by the tool in moving inwardly in the chuck, and members disconnected from said jaws and operated by said plunger in its inward movement and forcing said jaws against said wedge surface and into clamping engagement with the tool.

11. A chuck comprising, in combination, a body member, tool-clamping jaws thereon, a movable element on said body member presenting a wedge surface and operating, when shifted on said body member, to engage said jaws and shift the latter into clamping engagement with a tool inserted into the chuck, a plunger actuated by the tool in moving inwardly in the chuck, and members disconnected from said jaws and adapted to be forced toward the outer end of the chuck, by said plunger, in the inward movement of the latter, for forcing said jaws into clamping engagement with the tool.

12. A chuck comprising, in combination, a body member, tool-clamping jaws thereon, a movable element on said body member presenting a wedge surface and operating, when shifted on said body member, to engage said jaws and shift the latter into clamping engagement with a tool inserted into the chuck, a plunger actuated by the tool in moving inwardly in the chuck, a spring tending to force said plunger toward said jaws, and means disconnected from said jaws and adapted to be forced against said jaws by said plunger for forcing said jaws into clamping engagement with the tool.

13. A chuck comprising, in combination, a body member, tool-clamping jaws thereon, a movable element on said body member presenting a wedge surface and operating, when shifted on said body member, to engage said jaws and shift the latter into clamping engagement with a tool inserted into the chuck, a plunger actuated by the tool in moving inwardly in the chuck, a spring tending to force said plunger toward said jaws, and means disconnected from said jaws and adapted to be forced toward the outer end of the chuck and against said jaws in the action of said plunger in moving inwardly, for forcing said jaws into clamping engagement with the tool.

14. A chuck comprising, in combination, a body member, tool-clamping jaws thereon, a movable element on said body member presenting a wedge surface and operating, when shifted on said body member, to engage said jaws and shift the latter into clamping engagement with a tool inserted into the chuck, a plunger actuated by the tool in moving inwardly in the chuck, and members disconnected from said jaws and having pivotal connection with said plunger and adapted to be forced toward the outer end of the chuck by said plunger when the latter is actuated, for forcing said jaws into clamping engagement with the tool.

15. A chuck comprising, in combination, a body member, tool-clamping jaws thereon, a member adapted to be shifted on said body member and operating to shift said jaws into clamping engagement with a tool inserted into the chuck, a movable member actuated by the tool in moving inwardly, and a fourth member operatively engaging said movable member and shiftable by the latter, said fourth member being located between, and engaging, said body member and said jaws, and when said movable member is moved inwardly, operating to force said jaws toward the outer end of the chuck and against said second-named member for shifting said jaws toward the median line of the chuck.

16. A chuck comprising, in combination, a body member, tool-clamping jaws thereon, a member adapted to be shifted on said body member and having a wedge surface engaging said jaws for forcing the latter into clamping engagement with a tool inserted in the chuck, a movable member actuated by the tool in moving inwardly, and a second member operatively engaging said movable member and shiftable by the latter, said second member being located between, and engaging, said body member and said jaws and when said second member is moved inwardly, operating to force said jaws toward the outer end of the chuck and against said wedge surface for shifting said jaws toward the median line of the chuck.

17. A chuck comprising, in combination, a body member, tool-clamping jaws thereon, means for shifting said jaws into clamping engagement with a tool inserted into the chuck, and a series of movable members disconnected from said body member and from said jaws and located to engage opposed portions of said body member and said jaws and operating when moved in one direction to force said jaws away from said body member to cause said jaws to grip the tool, said movable members being actuated as stated, by the tool in moving inwardly in the jaws.

18. A chuck comprising, in combination, a body member, tool-clamping jaws thereon, means for shifting said jaws into clamping engagement with a tool inserted into the chuck, a series of movable members disconnected from said body member and from said jaws and located to engage opposed portions of said body member and said jaws and operating when moved in one direction to force said jaws away from said body member to cause said jaws to grip the tool, and a plunger operatively engaging said movable members and operating, when forced inwardly by the tool in moving inwardly, to actuate said movable members to force said jaws into tight engagement with the tool.

CARL A. PALMGREN.